United States Patent
Faust et al.

(10) Patent No.: US 8,110,153 B2
(45) Date of Patent: Feb. 7, 2012

(54) HOUSING FOR AN EXHAUST GAS TREATMENT COMPONENT WITH A REINFORCING SLEEVE, EXHAUST GAS TREATMENT COMPONENT, EXHAUST SYSTEM AND MOTOR VEHICLE

(75) Inventors: Hans-Günter Faust, Köln (DE); Jörg Gutowski, Eisenach (DE); Friedrich-Wilhelm Kaiser, Neunkirchen-Seelscheid (DE); Hermann Josef Müller, Kürten-Spitze (DE); Gottfried Wilhelm Haesemann, Kürten (DE)

(73) Assignee: Emitec Gesellschaft fuer Emissionstechnologie mbH, Lohmar (DE)

( * ) Notice: Subject to any disclaimer, the term of this patent is extended or adjusted under 35 U.S.C. 154(b) by 318 days.

(21) Appl. No.: 11/856,097

(22) Filed: Sep. 17, 2007

(65) Prior Publication Data

US 2008/0053080 A1 Mar. 6, 2008

Related U.S. Application Data

(63) Continuation of application No. PCT/EP2006/002221, filed on Mar. 10, 2006.

(30) Foreign Application Priority Data

Mar. 16, 2005 (DE) .................. 10 2005 012 067

(51) Int. Cl.
*B01D 50/00* (2006.01)

(52) U.S. Cl. .................. 422/179; 422/180

(58) Field of Classification Search .................. 422/168, 422/177, 179, 180; 60/301
See application file for complete search history.

(56) References Cited

U.S. PATENT DOCUMENTS

| 5,079,210 | A | | 1/1992 | Kaji et al. | |
|---|---|---|---|---|---|
| 5,116,581 | A | | 5/1992 | Cyron et al. | |
| 5,190,732 | A | * | 3/1993 | Maus et al. | 422/179 |
| 5,272,875 | A | * | 12/1993 | Kaji | 60/299 |
| 5,410,877 | A | * | 5/1995 | Shimada et al. | 60/302 |
| 6,267,932 | B1 | * | 7/2001 | Nilsson | 422/177 |
| 6,689,328 | B1 | * | 2/2004 | Otani et al. | 422/180 |
| 6,821,639 | B2 | * | 11/2004 | Kato | 428/593 |
| 2002/0096225 | A1 | | 7/2002 | Ishizu et al. | |
| 2005/0096218 | A1 | * | 5/2005 | Kurth et al. | 502/439 |

(Continued)

FOREIGN PATENT DOCUMENTS

DE 3728435 A1 10/1988

(Continued)

OTHER PUBLICATIONS

European Office Action dated Aug. 28, 2009.

*Primary Examiner* — Tom Duong
(74) *Attorney, Agent, or Firm* — Lawrence A. Greenberg; Werner H. Stemer; Ralph E. Locher

(57) ABSTRACT

A housing for an exhaust gas treatment component includes a casing having a first thickness and a first length and at least one sleeve having a second thickness and a second length. The at least one sleeve is at least partially in contact with the outside of the casing and is connected thereto. The second length of the at least one sleeve is shorter than the first length of the casing. An exhaust gas treatment component, an exhaust gas system and a motor vehicle are also provided.

12 Claims, 3 Drawing Sheets

U.S. PATENT DOCUMENTS

2005/0186127 A1 * 8/2005 Reck et al. .................... 422/180

FOREIGN PATENT DOCUMENTS

| | | | |
|---|---|---|---|
| EP | 1353049 | A2 | 10/2003 |
| EP | 1643095 | A1 | 4/2006 |
| JP | 62030533 | A | 2/1987 |
| JP | 3157139 | A | 7/1991 |
| JP | 6079181 | A | 3/1994 |
| JP | 06346726 | A1 | 12/1994 |
| JP | 3079838 | U | 8/2001 |

* cited by examiner

HOUSING FOR AN EXHAUST GAS TREATMENT COMPONENT WITH A REINFORCING SLEEVE, EXHAUST GAS TREATMENT COMPONENT, EXHAUST SYSTEM AND MOTOR VEHICLE

CROSS-REFERENCE TO RELATED APPLICATIONS

This is a continuation, under 35 U.S.C. §120, of copending International Application No. PCT/EP2006/002221, filed Mar. 10, 2006, which designated the United States; this application also claims the priority, under 35 U.S.C. §119, of German Patent Application DE 10 2005 012 067.9, filed Mar. 16, 2005; the prior applications are herewith incorporated by reference in their entirety.

BACKGROUND OF THE INVENTION

Field of the Invention

The invention relates to a housing for an exhaust gas treatment component which includes a casing with a first thickness and a first length, as well as at least one sleeve with a second thickness and a second length. The at least one sleeve lies at least partially on the outside of the casing and is connected thereto. Such housings serve, in particular, for holding exhaust gas treatment components which are provided for converting pollutants contained in exhaust gases of mobile internal combustion engines. The invention also relates to a corresponding exhaust gas treatment component, exhaust system and motor vehicle.

A large number of different criteria have to be taken into account in the configuration of such housings for exhaust gas treatment components. The housing must, for example, withstand the thermal and dynamic stresses in the exhaust system of motor vehicles. Furthermore, cost factors also have to be taken into account to a greater extent since such exhaust gas treatment components are frequently manufactured by using series fabrication. The housings promote the structural integrity of the exhaust gas treatment component and serve as a basis for securing the component in superordinate exhaust systems. Furthermore, the housings decisively influence the transfer of heat from the exhaust gas purification components into the surroundings. For that reason, the housing constitutes an important part of exhaust gas purification components and that part has already often been the subject matter of technical developments.

A further aspect which is increasingly gaining importance is the weight of such exhaust gas treatment components. Particularly for the field of motor sports or even for exhaust gas treatment components which are used in hand-held devices, a reduction in weight is desirable. For example, casings for that purpose are known which are formed with a plurality of cutouts or which have extremely thin wall thicknesses. However, the weakening of the casing which arises as a result thereof means that when the exhaust gas treatment component is secured in an exhaust system, or possibly also even during its manufacture, the exhaust gas treatment component is weakened, which places at risk the possibility of continuous use under high thermal and dynamic stresses in the exhaust system.

SUMMARY OF THE INVENTION

It is accordingly an object of the invention to provide a housing for an exhaust gas treatment component with a reinforcing sleeve, an exhaust gas treatment component, an exhaust system and a motor vehicle, which overcome the hereinafore-mentioned disadvantages and at least partially alleviate the technical problems, described with respect to the heretofore-known prior art devices of this general type. Furthermore, in particular, on one hand, the housing for an exhaust gas treatment component implements a reduction in weight, but on the other hand also ensures that the exhaust gas treatment component is permanently secured in an exhaust system. Additionally, the housing is to be configured in such a way that it can be easily manufactured or integrated in a series fabrication system.

With the foregoing and other objects in view there is provided, in accordance with the invention, a housing for an exhaust gas treatment component. The housing comprises a casing having an outside, a first thickness and a first length. At least one sleeve lies at least partially on the outside of the casing and is connected to the casing. The at least one sleeve has a second thickness and a second length, and the second length is shorter than the first length of the casing.

Such a housing is preferably fabricated from a metallic material and has a basically cylindrical structure. However, other structural shapes are also basically possible so that the housing can also have an oval, conical or any other cross-sectional profile. The housing is particularly suitable for withstanding the thermal and dynamic stresses in an exhaust system, that is to say for example even temperatures up to approximately 1,000° C.

The housing which is described herein is preferably embodied in two parts and includes a casing and a sleeve. The sleeve at least partially surrounds the casing on the outside so that at least part of the inner surface of the sleeve lies on the outer surface of the casing, in particular at least both boundaries of the at least one sleeve. The casing and the sleeve are preferably technically joined to one another, however it is basically also possible for the sleeve itself to be part of the casing. The preferred manner of producing the technical joining connection is by brazing. However, a sintering process or even welding may be used as well. The position of the sleeve with respect to the casing can be freely selected by taking into account the type of installation in an exhaust system and/or the thermal and dynamic stresses which occur, in which case at least the greater part of the sleeve is advantageously in contact with the casing. The sleeve is preferably not disposed in a protruding fashion but rather near to one end of the casing or approximately centrally.

The casing has a first thickness which is preferably less than 1.5 mm, in particular less than 1.0 mm, and quite particularly preferably less than 0.5 mm. Under certain circumstances, it is even possible for the casing to be embodied with a first thickness of less than 0.3 mm. The first length of the casing is, in particular, at least 50 mm, preferably more than 70 mm or even at least 90 mm.

The sleeve is embodied with a second length which is shorter than the first length of the casing. As a result, the sleeve extends only over part of the outer surface of the casing. In particular, the sleeve serves as a type of reinforcement or stiffening of the casing in a certain section, so that an improved stiffness of the exhaust gas treatment component or of the housing is implemented or else an additional or particularly suitable connecting point to adjacent components of an exhaust gas system is also made available. In this context, particularly lightweight housings can be made available, and at the same time the requirements in terms of the securing of the exhaust gas treatment component or of the structural integrity over the service life can be met. In this context, if appropriate, it is also possible to provide more than one sleeve, for example two or three sleeves. This is suitable, for example, if the exhaust gas treatment component is connected to an exhaust gas line (in a fixed fashion or in the manner of a guide) at two points which are axially spaced apart from one another.

In accordance with another feature of the invention, the second length of the at least one sleeve is in a range of from 10 mm to 40 mm. The at least one sleeve preferably has a second length of 15 to 20 mm. A relatively narrow sleeve is thus specified which therefore only influences the weight of the exhaust gas treatment component to a small degree. However, at the same time, the second length is selected in such a way that, for example, sufficient stiffening or material thickening for technical joining to adjacent components is made available.

In accordance with a further feature of the invention, the first thickness of the casing is less than the second thickness of the at least one sleeve. The second thickness (D2) is preferably greater than the first thickness (D1) of the casing by at least a factor (F) of 1.5, preferably even by at least a factor of 2, so that (D2>F*D1). Furthermore, it is preferred that the second thickness not exceed a value of 1.5 mm. It is thus possible to construct the casing particularly only with a thickness which is such that it provides the exhaust gas treatment component with its external shape while the load-bearing function of the entire exhaust gas treatment component is carried out predominantly through the use of the reinforcing sleeve.

In accordance with an added feature of the invention, the casing and the at least one sleeve have different thermal coefficients of expansion. This means that the casing and the sleeve expand to different degrees when thermal loading occurs and shrink to different degrees again when cooling occurs. In this context the embodiment in which the sleeve has a smaller coefficient of expansion than the casing, is preferred. This also ensures that the sleeve expands more slowly when thermal alternating stresses occur than the inner casing, so that contact with the casing is always ensured. Such different coefficients of expansion can be implemented, for example, through the use of different materials. Metal materials, for example austenitic or ferritic steels, are to be preferably used in this context.

In accordance with an additional feature of the invention, the at least one sleeve is disposed at one end of the casing. This is advantageous, in particular, if it is desired to secure the exhaust gas treatment component or the housing with further components of an exhaust system on only one side. The material reinforcement in the region of the end of the casing can then be used for securing it to an exhaust gas line. Particularly short sleeves can be used just for such a configuration. However, it is clear that such sleeves can also be provided at both ends of the casing if a similar securing operation is to be carried out at the other end of the casing.

In accordance with yet another feature of the invention, the casing and the at least one sleeve have at least one reinforcing structure. Such reinforcing structures are embodied, for example, as a thickening of material, as a bead, as a bulge or the like. Both the casing and the sleeve preferably have at least one reinforcing structure, in which case they are, if appropriate, superimposed one on the other. The embodiment in which the at least one reinforcing structure of the sleeve and the at least one reinforcing structure of the casing engage one in the other is quite particularly preferred. It is particularly preferred in this context that the reinforcing structure be embodied as a type of bulge or bead running around in the circumferential direction. The form of the bulge or bead in cross section can be selected according to the invention in the respective conditions, in which case, for example, even semicircle-like, omega-shaped or similar embodiments of a reinforcing structure can be implemented. If the structure is a circumferential reinforcing structure in this case which has a basically semicircular cross section, the latter extends over preferably less than 10 mm (millimeters) of the second length of the sleeve. According to one particularly preferred embodiment variant, the reinforcing structures of the casing and of the sleeve are embodied in such a way that they engage one in the other, in particular in a form-locking manner. A form-locking connection is one which connects two elements together due to the shape of the elements themselves, as opposed to a force-locking connection, which locks the elements together by force external to the elements.

In accordance with yet a further feature of the invention, the at least one sleeve has at least one boundary with an edge which at least in certain sections does not extend in the circumferential direction. As already mentioned, such a sleeve is constructed in such a way as to run round in the circumferential direction so that in each case the sleeve has a boundary in the axial direction. It is proposed in this case that at least one of these boundaries should not extend parallel to the ends of the casing but rather, at least in certain sections, should not extend in the circumferential direction or parallel thereto. The edge is thus longer than the boundary in the circumferential direction. A device is thus specified, for example, for reducing the flexural load on the casing when the housing is secured at one end. Therefore, the edge does not provide a predetermined break point which extends in the circumferential direction but rather, due to the profile which is fanned out broadly, results in a lower flexural load over the outer surface of the casing.

In accordance with yet an added feature of the invention, it is also proposed, with the aim, inter alia, of reducing the flexural load, that the at least one sleeve be embodied at least as a boundary with a thickness which is reduced as compared to the second thickness. This means that the at least one sleeve not only has a constant second thickness over its entire second length but also that there is a reduced thickness in the region of the boundary. The reduction in thickness occurs in this case preferably continuously, that is to say in a progression from the second thickness to a minimum value at the edge, for example from 0.5 or 0.3 mm. This measure also locally reduces the forces acting from the outside on the casing due to bending, and reduces the resulting weight of the housing.

In accordance with yet an additional feature of the invention, the casing and the at least one sleeve are at least partially brazed or welded to one another. Basically, at this point, it is to be noted that the at least one sleeve can be applied to the casing by shrink fitting, rolling, pressing or some other similar way. In order to form a preferably technical joining it is possible to braze or weld (in particular laser weld) these components to one another. In this context the connecting regions can be formed in the circumferential direction and in the length direction, in each case in an interrupted or continuous fashion.

In accordance with again another feature of the invention, it is advantageous that the at least one sleeve has at least one contact region for forming a welded connection and/or at least one reservoir for holding brazing material. The embodiment in which the sleeve forms at least a contact region and a reservoir is particularly preferred. The contact region (between the casing and the sleeve) serves to form, for example, a welding seam which is not closed over the circumference so that the sleeve can be secured to the casing cost-effectively and quickly using few welding points. This contact region can be formed over the circumference of the sleeve but it is also possible to form, at certain locations, contact regions which are not connected to one another, for example at the locations of a desired welding point. In one embodiment of the contact region as a depression which extends to the casing it is possible, for example, for the position of the welding point which is to be determined to be recognized automatically. The at least one reservoir is generally formed in such a way that a section of the sleeve which is spaced apart from the casing is formed in such a way that, for example, a cavity is formed between these components. It is possible for brazing material (for example in powder form) to be placed there. The brazing material both reinforces the connection between the casing and the sleeve during later thermal treatment of the housing and also ensures that the connection is provided in a gas-tight fashion. It is therefore also preferred for at least one reservoir to be formed which runs all around the circumference of the sleeve or the casing.

With the objects of the invention in view, there is also provided an exhaust gas treatment component, comprising at least one housing according to the invention, and at least one honeycomb structure disposed in the at least one housing. The at least one honeycomb structure has a multiplicity of channels through which a fluid can flow.

Such a honeycomb structure is preferably formed with at least partially structured, high-temperature-resistant metal foils. The term channels is meant to refer, in particular, to elongated cavities which extend at least over part of the axial length of the honeycomb structure. It is also possible in this context for the channels or passages to be closed off at least partially, with communicating channels then being formed in which the exhaust gas can flow from one channel to an adjacent one. Possible exhaust gas treatment components are catalytic converters, filters, particle separators, adsorbers, mixers or similar reactors.

With the objects of the invention in view, there is furthermore provided an exhaust gas system, comprising at least one exhaust gas treatment component including at least one housing according to the invention, and at least one honeycomb structure disposed in the at least one housing. The at least one honeycomb structure has a multiplicity of channels through which a fluid can flow. An exhaust gas line is welded to the at least one housing.

A region is preferably selected for this purpose in which the sleeve is provided. The embodiment in which a welding seam is formed through the exhaust gas line, the sleeve and the casing, is quite particularly preferred in this case. This occurs, for example, in the region of a reinforcing structure.

With the objects of the invention in view, there is also provided a motor vehicle, comprising at least one exhaust gas treatment component including at least one housing according to the invention, and at least one honeycomb structure disposed in the at least one housing. The at least one honeycomb structure has a multiplicity of channels through which a fluid can flow.

With the objects of the invention in view, there is concomitantly provided a motor vehicle, comprising an exhaust gas system including at least one exhaust gas treatment component having at least one housing according to the invention, and at least one honeycomb structure disposed in the at least one housing. The at least one honeycomb structure has a multiplicity of channels through which a fluid can flow. An exhaust gas line is welded to the at least one housing.

The term motor vehicle is meant to refer herein in particular to all ground vehicles (passenger cars, trucks, motorcycles, etc.). A further application of such exhaust gas treatment components is in hand-held devices (lawnmowers, chainsaws, etc.).

Other features which are considered as characteristic for the invention are set forth in the appended claims, noting that the features which are specified individually in the claims can be combined with one another in any desired technically appropriate way and constitute further embodiments of the housing according to the invention. Components of the general description or of the description of the figures can also be used for supplementary specification.

Although the invention is illustrated and described herein as embodied in a housing for an exhaust gas treatment component with a reinforcing sleeve, an exhaust gas treatment component, an exhaust system and a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
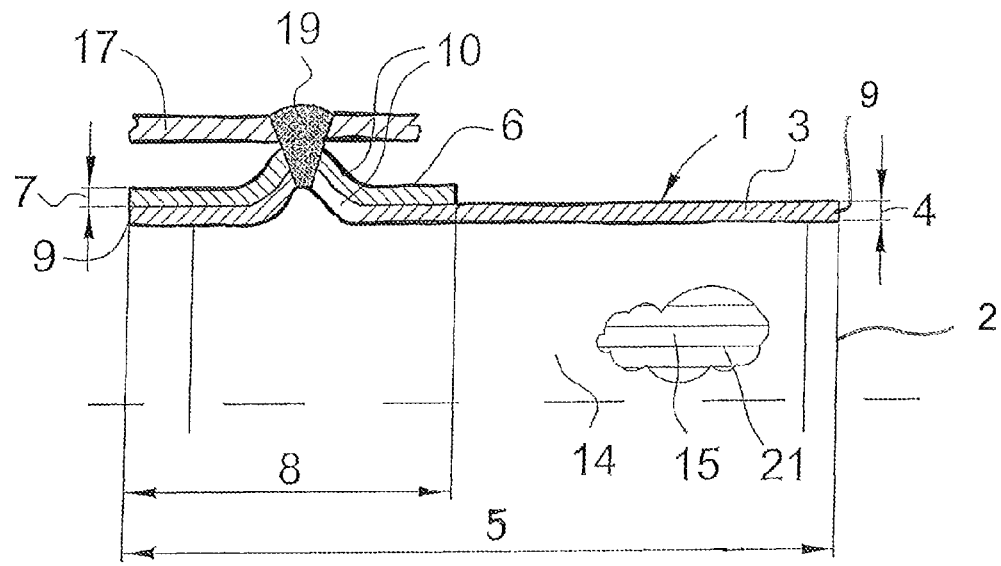
FIG. 1 is a fragmentary, diagrammatic, partly broken-away, longitudinal-sectional view of a first embodiment variant of a housing.

Referring now to the figures of the drawings in detail and first, particularly, to FIG. 1 thereof, there is seen a diagrammatic view, in a half section, through a preferred embodiment variant of a housing 1 for an exhaust gas treatment component 2. The housing 1 includes a casing 3 with a first thickness 4 and a first length 5 as well as a sleeve 6 with a second thickness 7 and a second length 8. The sleeve 6 lies on the outside of the casing 3 and is connected thereto (for example by a high-temperature vacuum brazing process). In this case, the second length 8 of the sleeve 6 is made shorter than the first length 5 of the casing 3. In the illustrated embodiment variant, the sleeve 6 is disposed flush with one end 9 of the casing 3. Both the casing 3 and the sleeve 6 each have a reinforcing structure 10 which is formed in such a way as to run around in the circumferential direction 12 (see FIG. 2). This reinforcing structure 10 serves exclusively to secure the exhaust gas treatment component 2 or the housing 1 to an illustrated exhaust line 17 through the use of a welding seam 19 which extends into or through the exhaust line 17, the sleeve 6 and the casing 3. The exhaust gas treatment component 2 has a honeycomb structure 14 which includes a plurality of channels 15 through which a fluid can flow. The channels 15 are formed by at least partially structured metal foils 21.

Figure 2:
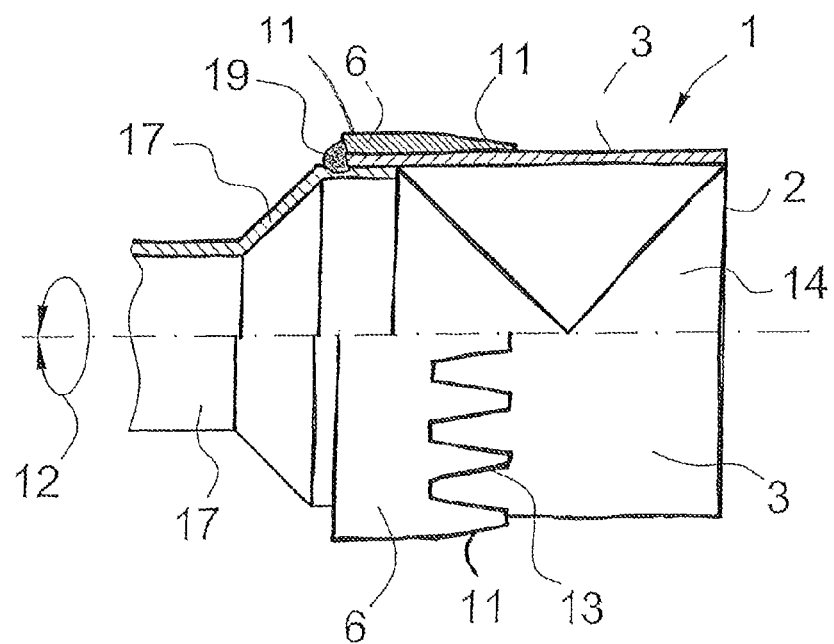
FIG. 2 is a fragmentary, half longitudinal-sectional and half plan view, of a second embodiment variant of an exhaust gas treatment component.

FIG. 2 is a diagrammatic view of a further embodiment variant of an exhaust gas treatment component 2, which is secured to an exhaust line 17 through the use of a welding seam 19. The illustration shows a longitudinal section at the top and a plan view of the exhaust gas treatment component 2 below a center line. It is apparent from the longitudinal section that the sleeve 6 is again attached to the outside of the casing 3. The sleeve 6 has boundaries 11 indicated at the right and the left in the figure. The boundary 11 at the right has a thickness which is reduced as compared to the second thickness 7. This boundary 11 is disposed in a region of the casing 3 which is distant from the ends 9 (see FIG. 1). The illustrated single-sided securing of the housing 1 to the exhaust line 17, which is inserted in this case into inner regions of the housing 1, was carried out through the use of the welding seam 19 which runs around in the circumferential direction 12 and runs along the end 9 of the casing and of the boundary 11 of the sleeve 6 which is not reduced in terms of its thickness. In order to reduce the flexural load on the casing 3, as is seen in the plan view, the boundary 11 of the sleeve 6 has an edge 13 which, at least in certain sections, does not extend in the circumferential direction 12. As is apparent from a comparison between the longitudinal section and the plan views, the profile of the edge 13 extends with a reduced thickness dimension over the region of the boundary 11.

Figure 3:
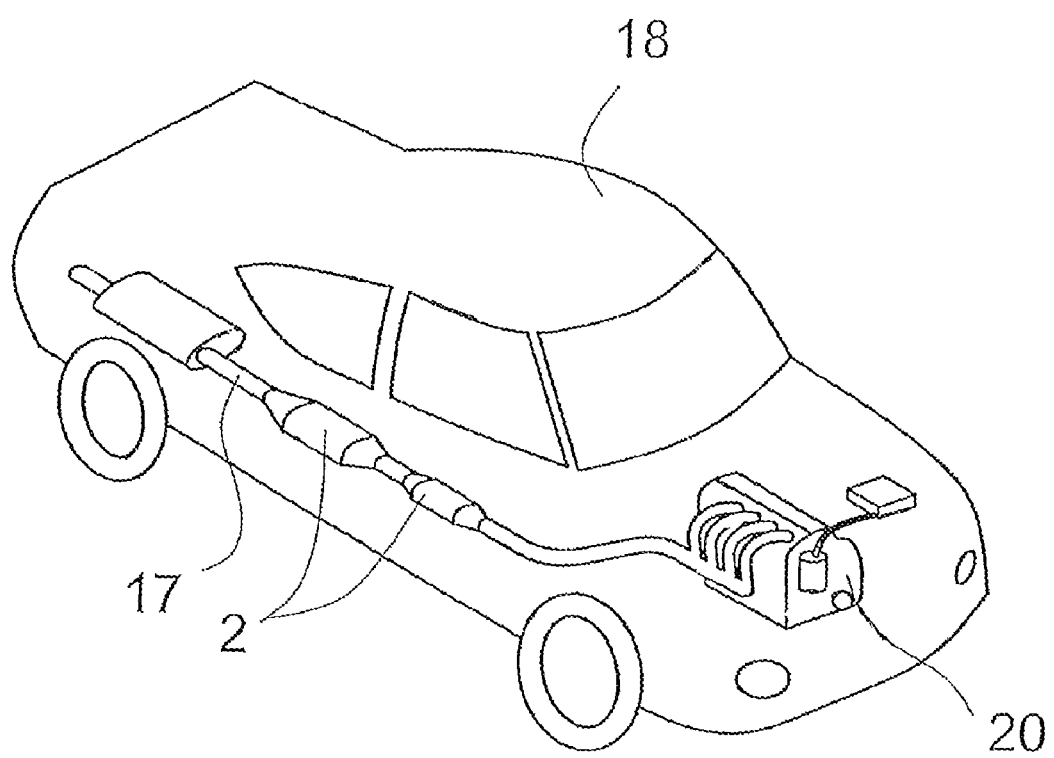
FIG. 3 is a perspective view of a motor vehicle with an exhaust system.

FIG. 3 shows a motor vehicle 18 which has a plurality of exhaust gas treatment components 2 that are disposed in the interior of an exhaust line 17. The exhaust gas treatment components 2 serve, for example, for converting pollutants contained in the exhaust gas, or for at least partially retaining those pollutants and/or solids which are formed in an internal combustion engine 20 of the vehicle 18. After the exhaust gas has been purified, it is output into the surroundings. The exhaust gas treatment components 2 which are proposed herein with the housing 1 according to the invention, are used in particular where the weight of the components is considerable.

Figure 4:
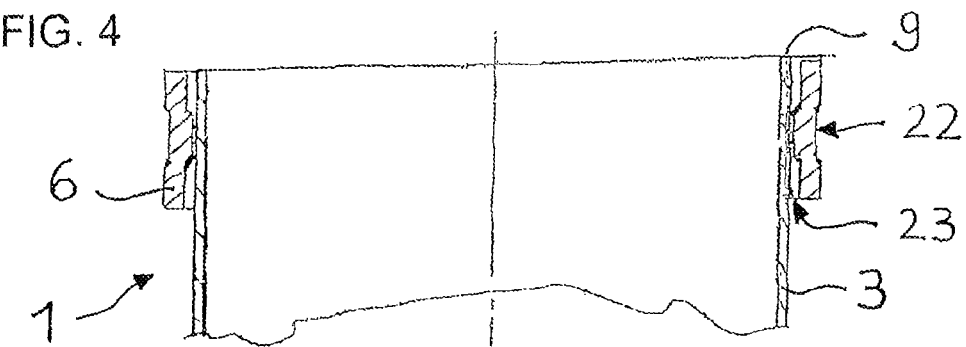
FIG. 4 is a fragmentary, longitudinal-sectional view of a third embodiment variant of the housing.
Figure 5:
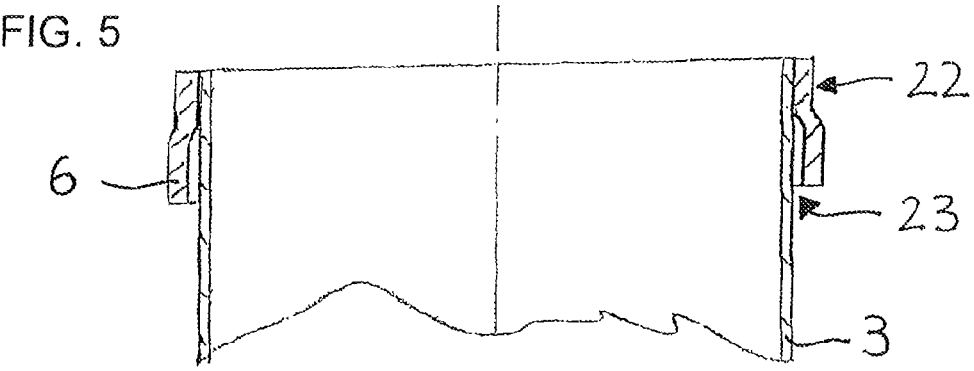
FIG. 5 is a fragmentary, longitudinal-sectional view of a fourth embodiment variant of the housing.
Figure 6:
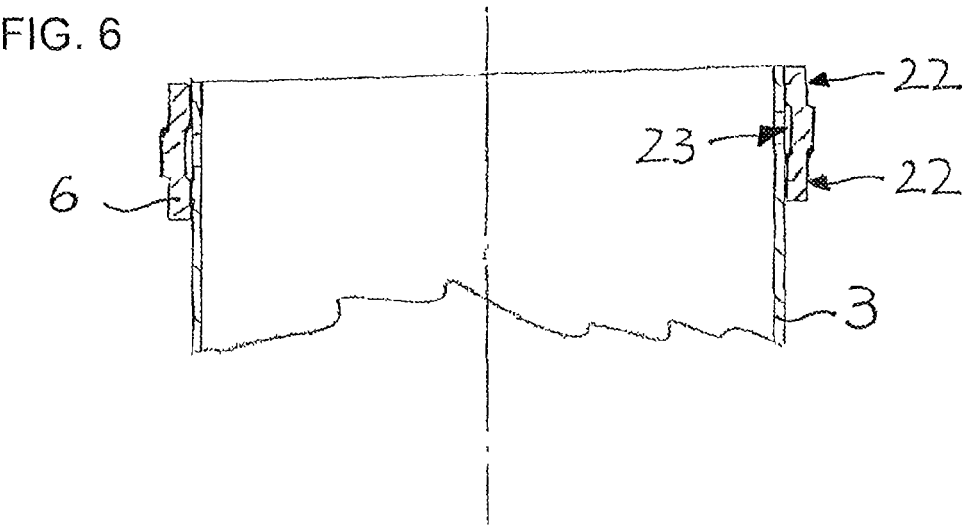
FIG. 6 is a fragmentary, longitudinal-sectional view of a fifth embodiment variant of the housing.

Finally, FIGS. 4, 5 and 6 illustrate further embodiment variants of the housing 1, in which the illustrated sleeves 6 that are disposed flush with one end 9 of the casing 3 have at least one contact region 22 for forming a welded connection and at least one reservoir 23 for holding brazing material.

The sleeve 6 of FIG. 4 has a symmetrical structure in which the contact region 22 is formed centrally and reservoirs 23 are each formed adjacent the contact region 22. In this configuration, the reservoirs 23 can still be accessed after mounting, so that the brazing material can still be applied then. A basically inverted configuration is shown in FIG. 6, in which the brazing material is advantageously applied before the mounting in the region of the reservoir 23. A further, two-part structure of the sleeve 6 is shown in FIG. 5. Even though only preferred exemplary embodiments are shown herein with respect to the structure of the sleeve 6, further, similar refinements may be expedient, taking into account the type of connection between the casing 3 and the sleeve 6.

The invention claimed is:

1. A housing for an exhaust gas treatment component, the housing comprising:
a casing having an outside, a first thickness and a first length, said outside having an outer surface;
at least one sleeve having an inner surface, said at least one sleeve lying at least partially on said outside of said casing and being connected to said casing, said at least one sleeve having at least one contact region and at least one reservoir for receiving brazing material, said contact region being defined by at least part of said inner surface of said sleeve lying on said outer surface of said casing, said at least one reservoir being a cavity between said sleeve and said casing defined by a section of said sleeve spaced apart from said casing, said at least one sleeve having a second thickness and a second length, said second length being shorter than said first length of said casing; and
at least one brazing connection at said reservoir for at least partially fastening said casing and said at least one sleeve to one another.

2. The housing according to claim 1, wherein said second length of said at least one sleeve is in a range of from 10 mm to 40 mm.

3. The housing according to claim 1, wherein said first thickness of said casing is less than said second thickness of said at least one sleeve.

4. The housing according to claim 1, wherein said casing and said at least one sleeve have different thermal coefficients of expansion.

5. The housing according to claim 1, wherein said at least one sleeve is disposed at one end of said casing.

6. The housing according to claim 1, wherein said casing and said at least one sleeve have at least one reinforcing structure.

7. The housing according to claim 1, wherein said at least one sleeve has at least one boundary with an edge which, at least in certain sections, does not extend in circumferential direction.

8. The housing according to claim 1, wherein said at least one sleeve has a boundary with a thickness being reduced as compared to said second thickness.

9. An exhaust gas treatment component, comprising:
at least one housing according to claim 1; and
at least one honeycomb structure disposed in said at least one housing, said at least one honeycomb structure having a multiplicity of channels through which a fluid can flow.

10. An exhaust gas system, comprising:
at least one exhaust gas treatment component including at least one housing according to claim 1, and at least one honeycomb structure disposed in said at least one housing, said at least one honeycomb structure having a multiplicity of channels through which a fluid can flow; and
an exhaust gas line welded to said at least one housing.

11. A motor vehicle, comprising:
at least one exhaust gas treatment component including at least one housing according to claim 1, and at least one honeycomb structure disposed in said at least one housing, said at least one honeycomb structure having a multiplicity of channels through which a fluid can flow.

12. A motor vehicle, comprising:
an exhaust gas system including at least one exhaust gas treatment component having at least one housing according to claim 1, at least one honeycomb structure disposed in said at least one housing, said at least one honeycomb structure having a multiplicity of channels through which a fluid can flow, and an exhaust gas line welded to said at least one housing.

* * * * *